United States Patent
Abe et al.

(10) Patent No.: US 6,839,967 B2
(45) Date of Patent: Jan. 11, 2005

(54) LIGHTENED DISK FOR A WHEEL AND A METHOD FOR MANUFACTURING THE SAME

(75) Inventors: Kishiro Abe, Ayase (JP); Ryoichi Watanabe, Toyokawa (JP); Ryo Nishibayashi, Ayase (JP); Yuji Iwakura, Toykawa (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 44 days.

(21) Appl. No.: 10/202,086

(22) Filed: Jul. 25, 2002

(65) Prior Publication Data

US 2002/0180255 A1 Dec. 5, 2002

Related U.S. Application Data

(62) Division of application No. 09/621,683, filed on Jul. 21, 2000, now abandoned.

(51) Int. Cl.⁷ .................................................. B23P 15/00
(52) U.S. Cl. ................................... 29/894.325; 72/347
(58) Field of Search ................. 29/894.325; 301/63.101, 301/63.103, 63.107; 72/347

(56) References Cited

U.S. PATENT DOCUMENTS

| | | |
|---|---|---|
| 1,413,051 A | 4/1922 | Michelin |
| 1,533,438 A | 4/1925 | Main |
| 2,406,082 A | 8/1946 | Cornell |
| 2,584,309 A | 2/1952 | Voorhees |
| 2,975,511 A | 3/1961 | Johnson |
| 3,262,191 A | 7/1966 | Albertson et al. |
| 3,442,110 A | 5/1969 | Walton et al. |
| 3,664,000 A * | 5/1972 | Le Jeune ................ 29/894.325 |
| 4,561,275 A * | 12/1985 | Itou et al. ....................... 72/70 |
| 5,257,455 A * | 11/1993 | Iwatsuki ................ 29/894.323 |
| 5,577,810 A * | 11/1996 | Abe et al. ............... 301/63.105 |
| 5,634,271 A * | 6/1997 | Lipper .................... 29/894.323 |
| 5,664,329 A * | 9/1997 | Nickel .................... 29/894.324 |
| 5,722,165 A * | 3/1998 | Kobayashi et al. .... 29/894.325 |
| 5,810,067 A * | 9/1998 | Atari et al. .................. 164/120 |
| 5,899,537 A * | 5/1999 | Abe et al. ............... 301/63.101 |
| 5,933,956 A * | 8/1999 | Bonning et al. ........ 29/894.323 |
| 2002/0007556 A1 * | 1/2002 | Marron et al. ......... 29/894.325 |

FOREIGN PATENT DOCUMENTS

| | | |
|---|---|---|
| GB | 400904 | 1/1932 |
| GB | 754725 | 8/1956 |
| JP | 57-134301 | 8/1982 |
| JP | 11-59101 | 3/1999 |
| JP | 11-77227 | 3/1999 |
| JP | 11-227401 | 8/1999 |
| JP | 2000-176580 | 6/2000 |

* cited by examiner

*Primary Examiner*—Irene Cuda Rosenbaum
(74) *Attorney, Agent, or Firm*—Pillsbury Winthrop LLP

(57) ABSTRACT

A lightened disk for a wheel has a flange having an axially inboard edge. The inboard edge includes a general portion which is located in a plane perpendicular to an axis of the disk. The flange portion has a thickness less than 90% of a thickness of a disk material at at least the general portion of the inboard edge. A method for manufacturing a lightened disk for a wheel includes a drawing step during which the flange portion is drawn such than the flange portion has a thickness less than 90% of a thickness of a disk material at at least the general portion of the inboard edge.

5 Claims, 6 Drawing Sheets

FIG. 3A
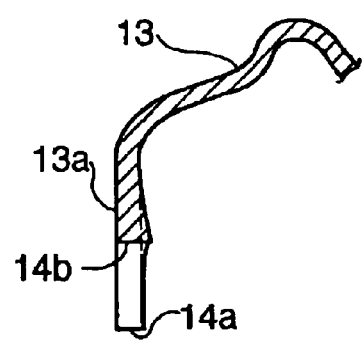
BEFORE DRAWING
FIG. 3B    FIG. 3C    FIG. 3D
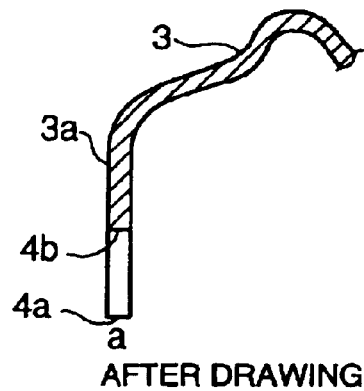 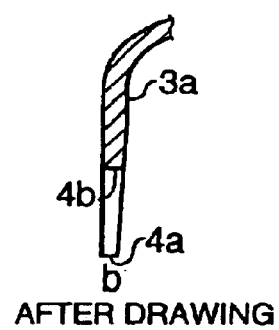 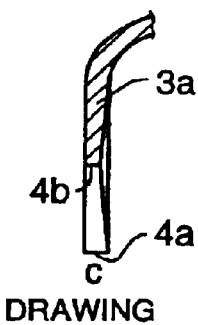
AFTER DRAWING    AFTER DRAWING    AFTER DRAWING (a)  (b)

(c)

(d)  (e)

LIGHTENED DISK FOR A WHEEL AND A METHOD FOR MANUFACTURING THE SAME

This is a Divisional National Application Ser. No. 09/621,683 filed Jul. 21, 2000 now abandoned.

BACKGROUND OF THE INVENTION

1. Field of the Invention

The present invention relates to a lightened disk for a wheel and a method for manufacturing the same.

2. Description of Related Art

A conventional method for manufacturing a conventional disk for an automobile wheel is illustrated in FIG. 8. As illustrated in FIG. 8, a flat blank 12 is stamped from a flat plate 11. The blank 12 is then plastically deformed into a disk 13 by pressing the blank at least one time, usually four or five times. Due to an increase or decrease in a thickness during press-forming, portions having a thickness greater than a thickness of the flat blank or having; a thickness smaller than a thickness of the flat blank are formed in the disk 13. More particularly, as illustrated in FIG. 9, a curved portion B having a small radius is thinner than the flat blank, and a portion A reduced in diameter (the flange portion 13a) is thicker than the flat blank. Measuring the disks having a relatively long flange portion, it was found that a thickness at the axially inboard edge of the flange portion increases to a thickness 1.5 times greater than the thickness of the disk material (flat blank). When the blank is deformed to the flange portion accompanied by a decrease in diameter, since the cross section does not change, the thickness of the flange portion is increased in proportion to a ratio D1/D2, where D1 is a diameter before deforming and D2 is a diameter after deforming. Further, the flange portion includes an axially inboard edge 14 which includes a general portion 14a corresponding to an arc portion 12a of the flat blank 12 and a curved portion (ventilation portion) 14b corresponding to a straight side 12b of the flat blank 12, and the thickness increase at the ventilation portion 14b, especially the center of the ventilation portion, is greater than other portions. This is caused because the axial length of the ventilation portion is smaller than the general portion and a resistance against the diameter reduction is smaller at the ventilation portion than at the general portion, so that material around the ventilation portion flows into the ventilation portion during plastic deforming and the great thickness increase occurs. This thickness increase has been thought to be an inevitable consequence of plastic deformation.

However, there are the following problems with the conventional disk for a wheel.

A stress and stress variation generated in the flange portion of the disk is much smaller than that generated in other portions of the wheel. There is substantially no breakage at the flange portion. Therefore, there will be no problem from the standpoint of strength even if the thickness of the flange portion is reduced. Irrespective of that, since the flange portion of the conventional disk is thicker than other portions of the disk due to thickening during deforming, increase in weight and cost occurs.

SUMMARY OF THE INVENTION

An object of the present invention is to provide a lightened disk for a wheel where a flange portion is reduced in thickness, and a method for manufacturing the lightened disk.

The present invention is as follows:

(1) A lightened disk for a wheel, drawn from a flat disk material, includes: an axis; and a flange portion extending substantially parallel to the axis. The flange portion includes an axially inboard edge. The axially inboard edge includes at least one general portion extending circumferentially in a plane essentially perpendicular to the axis at at least a portion of the axially inboard edge. The flange portion has a thickness equal to or less than about 90% of a thickness of the disk material at the general portion of the axially inboard edge.

(2) In the lightened disk of above (1), the flange portion has a substantially constant thickness over an entire axial length of the flange portion.

(3) In the lightened disk of above (1), the flange portion has a gradually decreasing thickness in a direction from a root of the flange portion to the axially inboard edge.

(4) In the lightened disk of above (1), the axially inboard edge of the flange portion has four general portions and four ventilation portions. Each of the ventilation portions is located between adjacent two general portions of the four general portions and is curved in an axially outboard direction from the plane in which the four general portions are located. The flange portion has a thickness equal to or less than about 90% of the thickness of the disk material at at least the general portions of the axially inboard edge.

(5) In the lightened disk of above (4), the ventilation portions have a thickness equal to or less than the thickness of the general portions and equal to or less than the thickness of the disk material at at least an axially end of a center of the ventilation portion.

(6) In the lightened disk of above (1), the axially inboard edge of the flange portion includes the general portion only. The flange portion has a thickness equal to or less than about 90% of the thickness of the disk material over an entire circumference of the axially inboard edge.

(7) A method of manufacturing a lightened disk for a wheel includes: stamping a flat disk material from a flat plate; manufacturing a disk by plastically deforming at least one time the disk material so that the disk includes a flange portion having an axially inboard edge, the axially inboard edge including at least one general portion extending circumferentially in a plane essentially perpendicular to an axis at at least a portion of the axially inboard edge; and drawing the flange portion on or after the deforming of any of the at least one time so that the flange portion is reduced to a thickness equal to or less than about 90% of a thickness of the disk material at the general portion of the axially inboard edge.

(8) In a method of above (7), drawing is conducted using an inner die and an outer die having a gap less than 90% of the thickness of the disk material between the inner die and the outer die.

(9) In a method of above (7), during stamping, the flat disk material is obtained by stamping four corners of the flat plate having a square at a circle having a diameter greater than a length of a side of the square. During plastically deforming the disk material, the disk is deformed such that the axially inboard edge of the flange portion includes four general portions and four ventilation portions. Each of the ventilation portions is located between adjacent two general portions of the four general portions and is curved in an axially outboard direction from the plane in which the four general portions are located. During drawing, the flange portion is drawn such that the flange portion has a thickness equal to or less than about 90% of the thickness of the disk material at at least the general portions of the axially inboard edge.

(10) In a method of above (9), during drawing, the ventilation portions are drawn such that the ventilation portions have a thickness equal to or less than the thickness of the general portions and equal to or less than the thickness of the disk material at at least an axially end of a center of the ventilation portion.

(11) In a method of above (7), during stamping, the flat plate is stamped such that the disk material has a substantially circular configuration. During plastically deforming the disk material, the disk is deformed such that the axially inboard edge of the flange portion has the general portion only. The general portion is located in the plane essentially perpendicular to the axis. During drawing, the flange portion is drawn such that the flange portion has a thickness equal to or less than about 90% of the thickness of the disk material at an entire circumference of the axially inboard edge of the flange portion.

With the disk of above (1)–(6) and with the method of above (7)–(11), since the flange portion is drawn such that the flange portion has a thickness equal to or less than about 90% of the thickness of the disk material at at least the general portions, the flange portion, which was unnecessarily thick, can be thinned without causing a strength problem, so that the disk is lightened. Further, in the drawing, since the flange portion is lengthened in the axial direction by the unnecessary thick material, the length of the side of the disk material can be shortened, so that a yield or efficiency of the material is improved and a material cost for the disk is decreased. Furthermore, since by drawing, a spring back and a circumferential wave in the flange portion are reduced, a radial deflection of a wheel and a strength of the coupling portion of the disk and the rim are improved.

With the disk of above (5) and with the method of above (10), since the ventilation portions have a thickness equal to or less than the thickness of the general portions and equal to or less than the thickness of the disk material, the axial length of the flange portion further increases at the ventilation portion. As a result, the length of the side of the square disk material having arc cut corners is capable of being further shortened, so that a yield or efficiency of the material is further improved and a material cost for the disk is further decreased.

With the disk of above (6) and with the method of above (11), since an entire circumference of the general portion of the flange portion is drawn, a yield or efficiency of the material is improved and a material cost for the disk is decreased.

BRIEF DESCRIPTION OF THE DRAWINGS

The above and other objects, features, and advantages of the present invention will become apparent and will be more readily appreciated from the following detailed description of the preferred embodiments of the present invention in conjunction with the accompanying drawings, in which:

FIG. 3A is a cross-sectional view of the flange portion before drawing (corresponding to a conventional one) of the disk of FIG. 1;

FIG. 3B is a cross-sectional view of the flange after drawing (including an embodiment (a) of the present invention) of the disk of FIG. 1;

FIG. 3C is a cross-sectional view of the flange after drawing (including an embodiment (b) of the present invention) of the disk of FIG. 1;

FIG. 3D is a cross-sectional view of the flange after drawing (including an embodiment (c) of the present invention) of the disk of FIG. 1;

DETAILED DESCRIPTION OF THE PREFERRED EMBODIMENTS

Figure 5A:
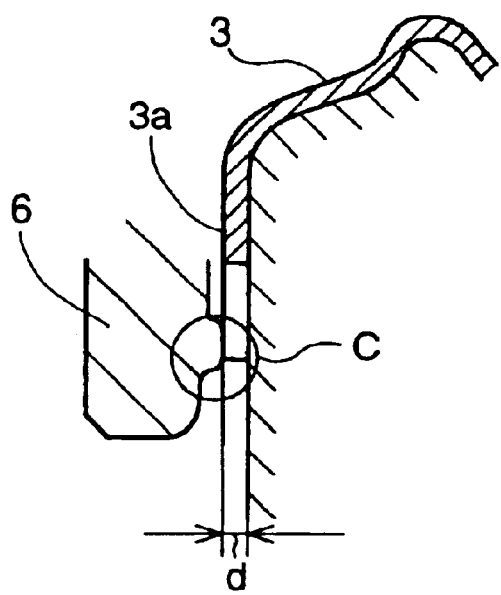
FIG. 5A is a cross-sectional view of dies during drawing in the method according to one embodiment of the present invention.
Figure 5B:
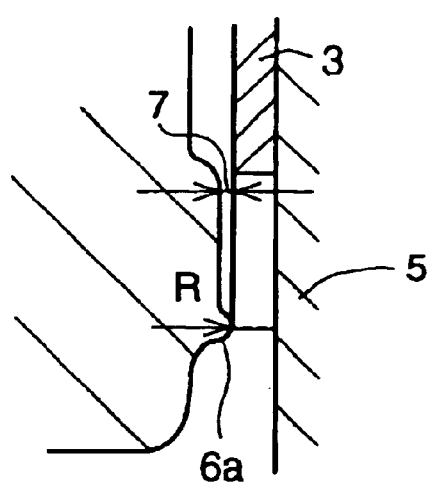
FIG. 5B is an enlarged view of portion C of FIG. 5A.
Figure 6:
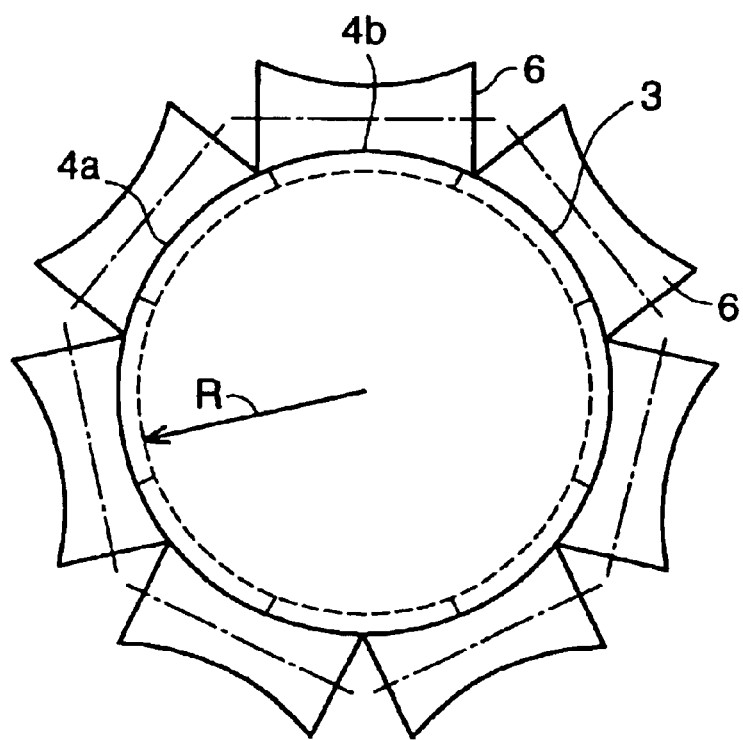
FIG. 6 is a plan view of dies during drawing in the method according to another embodiment of the present invention.
Figure 7:
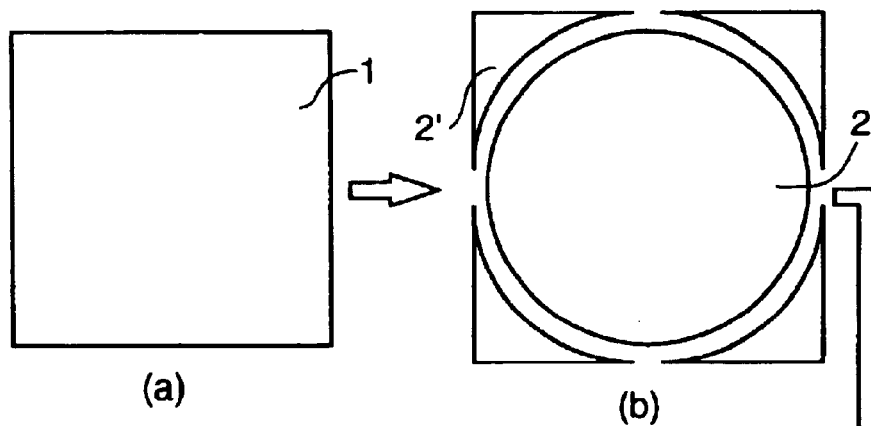
FIG. 7 is a process diagram of a method for manufacturing a disk according to a second embodiment of the present invention, wherein step (a) illustrates a flat plate, step (b) illustrates a circular disk material, step (c) illustrates that deforming and drawing are conducted in the same step, and steps (d) and (e) illustrate that drawing is conducted after deforming.
Figure 7:
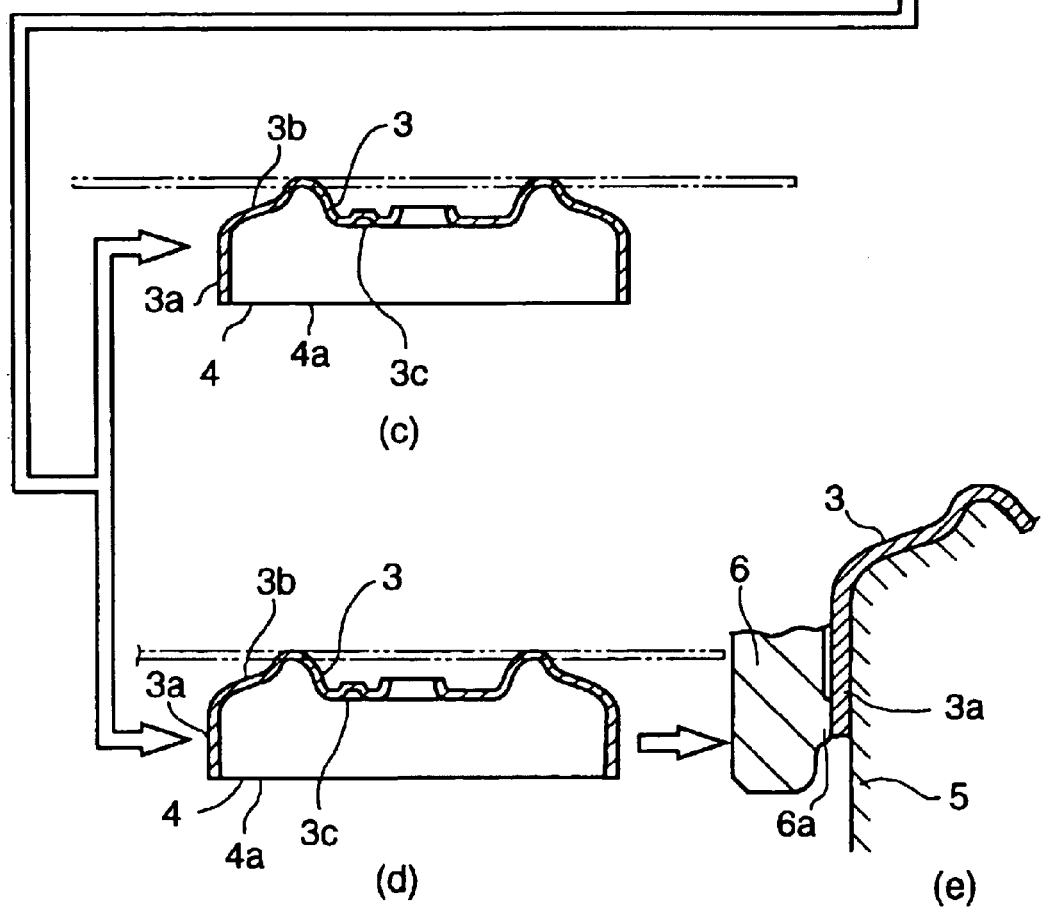
Figure 8:
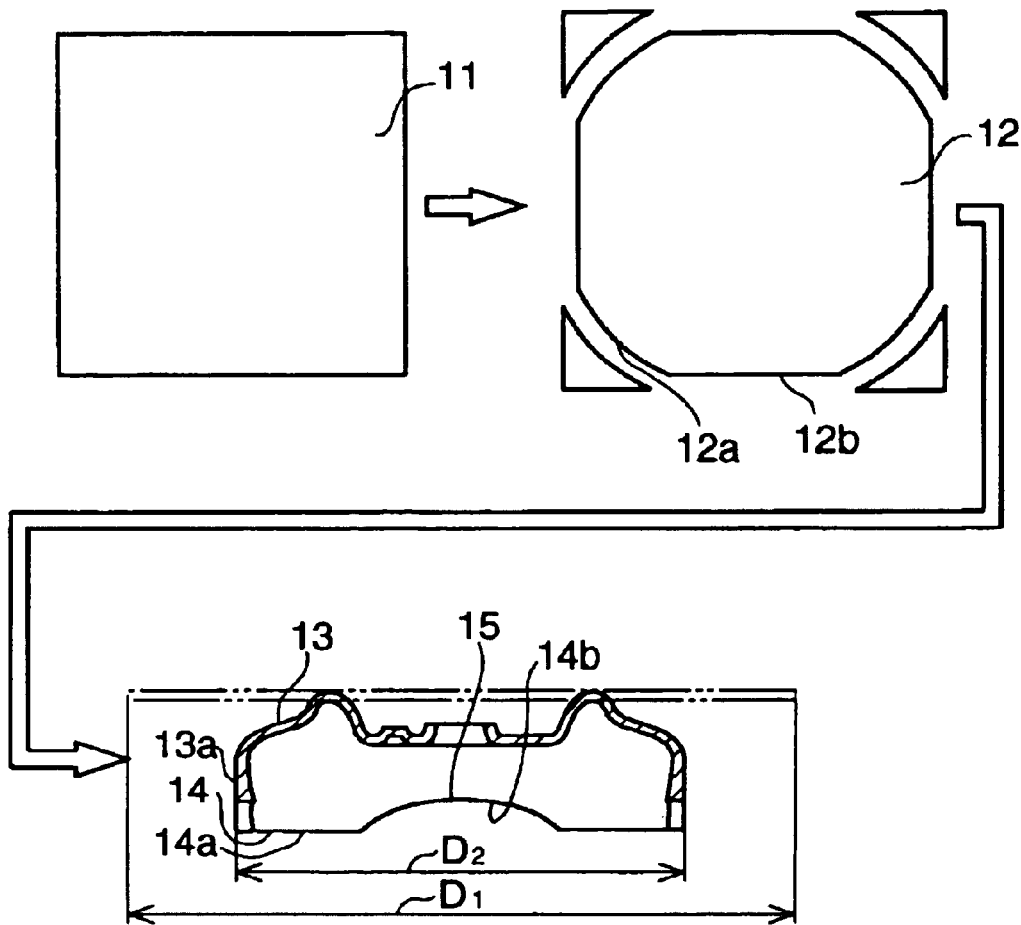
FIG. 8 is a process diagram of a conventional method for manufacturing a disk.
Figure 9:
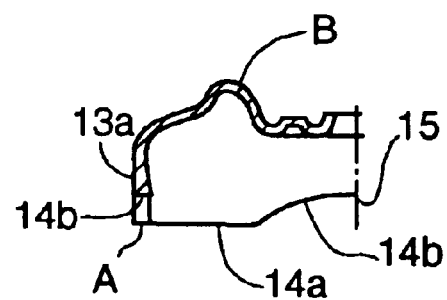
FIG. 9 is a cross-sectional view of a half portion of the conventional disk.

FIGS. 1–6 illustrate a lightened disk for a wheel, and a manufacturing method of the disk according to a first embodiment of the present invention where the flange portion of the disk has a ventilation portion, and FIG. 7 illustrates a lightened disk for a wheel, and a manufacturing method of the disk according to a second embodiment of the present invention where the flange portion of the disk has no ventilation portion. Structural portions common or similar to the first and second embodiments of the present invention are denoted with the same reference numerals as in the first and second embodiments.

First, the structural portions common or similar to the first and second embodiments of the present invention will be explained.

A lightened disk 3 for a wheel according to the present invention is a disk drawn from a flat disk material 2. The lightened disk 3 for a wheel includes a flange portion 3a located at a radially outer portion of the disk and extending substantially parallel to an axis of the wheel, i.e., in a straightly cylindrical configuration, a hub portion (hub coupling portion) 3c located at a central portion of the disk and extending substantially perpendicularly to the axis of the wheel, and hat portion 3b connecting the flange portion 3a and the hub portion 3c. The flange portion 3a includes an axially inboard edge 4. The axially inboard edge 4 includes at least one general portion 4a extending circumferentially in a plane perpendicular to the axis at at least a portion of the axially inboard edge 4. The flange portion 3a has a thickness equal to or less than 90% of a thickness of the disk material 2 at the general portion 4a of the axially inboard edge 4.

The flange portion 3a has a thickness equal to or less than 90%, for example, 10–90% of a thickness of the disk material 2 at at least the general portion 4a of the axially inboard edge 4 and is reduced in thickness. The flange portion 3a maybe reduced to a thickness equal to or less than 90% of the thickness of the disk material 2 not only at the axially inboard edge 4 but also at an entire range of the flange portion 3a.

The thinned flange portion 3a may have a substantially constant thickness over an entire axial length of the flange portion as illustrated in embodiment (a) of FIG. 3B, or may have a gradually decreasing thickness in a direction from a root of the flange portion to the axially inboard edge 4a as illustrated in embodiment (b) of FIG. 3C.

In the case of embodiment (a) of FIG. 3B, the flange portion 3a should have a thickness of 50–90% of the thickness of the disk material 2. The reason is that if the thickness of the flange portion 3a is more reduced, during drawing, resistance will become too large and the flange portion will be broken. In the case of embodiment (b) of FIG. 3C, the flange portion 3a should have a thickness of 30–70% of the thickness of the disk material 2 at the axially inboard edge 4 and a thickness of 50–90% of the thickness of the disk material 2 at the root of the flange portion 3a. The reason is that if the thickness of the flange portion 3a is more reduced, during drawing resistance will become too large and the flange portion will be broken.

Next, structural portions unique to each embodiment of the present invention will be explained.

In the first embodiment of the present invention, as illustrated in FIGS. 1–6, the axially inboard edge 4 of the flange portion 3a has four general portions 4a and four ventilation portions 4b. Each general portion 4a is located in the plane perpendicular to the axis of the disk and extends in a circumferential direction of the disk. Each ventilation portion 4b is located between adjacent two general portions 4a of the four general portions and is curved in an axially outboard direction from the plane in which the four general portions 4a are located.

Figure 2:
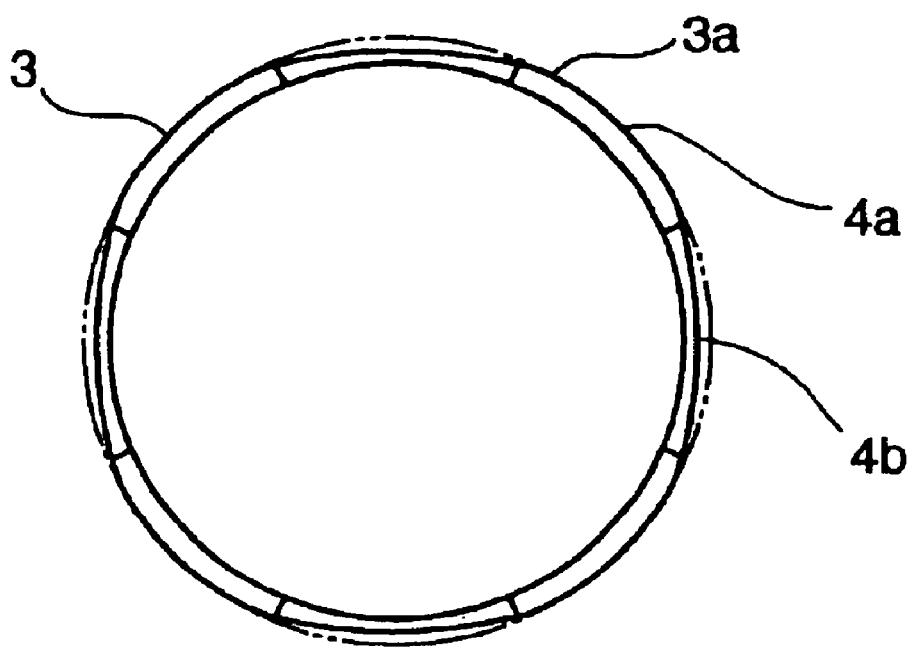
FIG. 2 is an elevational view of an axially inboard edge of a flange portion of the disk of FIG. 1.

As illustrated in embodiment (c) of FIG. 3D and FIG. 2, in the case the flange portion 3a has the ventilation portion 4b, preferably each ventilation portion 4b has a thickness equal to or less than the thickness of the general portions 4a and equal to or less than 100% (more preferably, equal to or less than 60%), for example, 10–60% of the thickness of the disk material 2 at at least an axially end P of a center of the ventilation portion 4b. Further, the ventilation portion 4b may be thinned to a thickness equal to or less than 100% (more preferably, equal to or less than 60%) of the thickness of the disk material 2 at the entire length of the edge. Further, the thickness reduction of the flange portion may depend on any combination of embodiments (a), (b) and (c) of FIGS. 3B, 3C, and 3D, respectively.

In the second embodiment of the present invention, as illustrated in FIG. 7, the axially inboard edge 4 of the flange portion 3a does not have a ventilation portion and includes the general portion 4a only. The general portion 4a is located in a single plane perpendicular to the axis of the wheel over an entire circumference of the axially inboard edge. The flange portion 4a has a thickness equal to or less than 90% of the thickness of the disk material.

Next, a method of manufacturing a lightened disk for a wheel according to the present invention will be explained. First, portions common to the first embodiment and the second embodiment will be explained.

Figure 4:
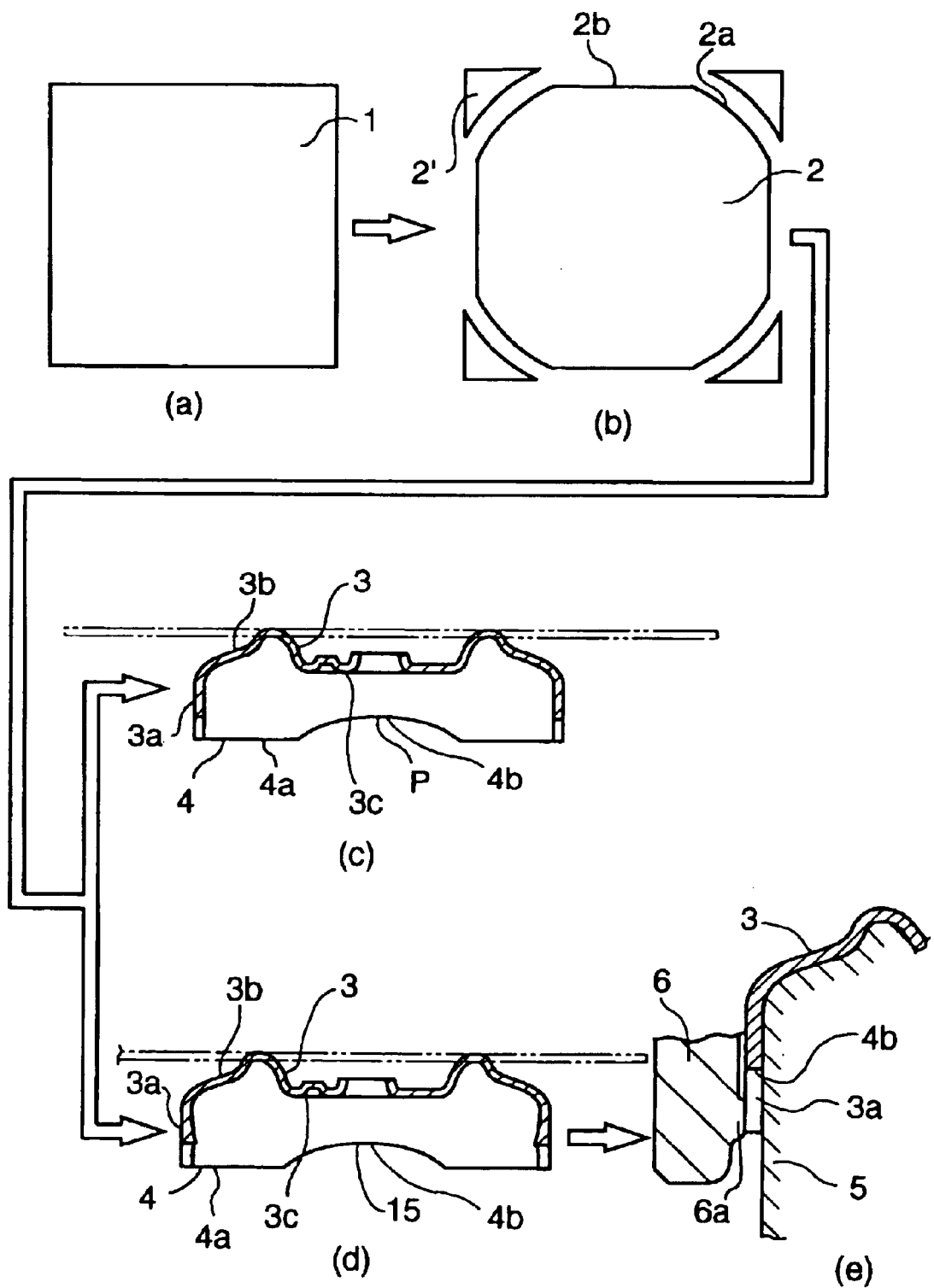
FIG. 4 is a process diagram of a method for manufacturing a disk according to a first embodiment of the present invention, wherein step (a) illustrates a flat plate, step (b) illustrates a square disk material four corners of which are cut, step (c) illustrates that deforming and drawing are conducted in the same step, and steps (d) and (e) illustrate that drawing is conducted after deforming.

As illustrated in FIGS. 4 and 7, the method of manufacturing a lightened disk for a wheel includes: obtaining a flat disk material 2, plastically deforming the disk material 2 to a disk 3 having a straightly cylindrical flange portion 3a, and drawing the flange portion 3a of the disk 3 on or after the plastic deformation.

To obtain the flat disk material 2, the flat disk material 2 is stamped from a flat plate 1 of steel or aluminum. The disk material 2 has a substantially circular configuration of a substantially square configuration four corners 2' of which are stamped off. The stamped four corners 2' are scrap.

To manufacture the disk 3, the disk material 2 is plastically deformed at least one time (preferably, four or five times) so that the disk 3 includes a straightly cylindrical flange portion 3a having an axially inboard edge 4 and the axially inboard edge 4 includes at least one general portion 4a extending circumferentially in a plane perpendicular to the axis at at least a portion of the axially inboard edge 4.

During drawing, the flange portion 3a is drawn so that the flange portion 3a is thinned to a thickness equal to or less than 90% of a thickness of the disk material 2 at the general portion 4a of the axially inboard edge 4 when or after the disk 3 is deformed. In this instance, drawing means a plastic working accompanied by a change in thickness of the workpiece.

As illustrated in FIGS. 5A, 5B and 6, drawing is conducted using an inner die 5 and an outer die 6 having a gap (d) less than 90% of the thickness of the disk material between the inner die and the outer die. The inner die has an outer surface having the same configuration as a configuration of an inner surface of the disk. The gap was conventionally determined taking into consideration the thickness increase during deforming, but in the present invention the gap is determined taking into consideration the thickness reduction during drawing.

FIGS. 5A and 5B illustrate that drawing is conducted using the inner die and the outer die 6 which is a single integral ring. The outer die 6 is moved in the upward and downward direction relative to the inner die 5. In a case where the disk with the flange portion having a varying thickness in the axial direction as illustrated in embodiments (b) and (c) in FIGS. 3C and 3D, the outer configuration of the inner die 5 has to be changed from a vertical straight configuration. The outer die 6 of a ring has a protrusion 6a having an R configuration protruding radially inwardly. This protrusion 6a is a means for preventing the outer die 6 from sticking to a workpiece during drawing. A portion of the outer die positioned above the protrusion 6a recedes from the outer surface of the workpiece to constitute an escaping gap 7.

FIG. 6 illustrates that drawing is conducted using the inner die and another outer die 6 which includes a plurality of (for example, seven) rollers having an arc configuration. Either one of the rollers 6 and the inner die 5 is moved upwardly and downwardly relative to the other. In a case where the disk with the flange portion having a varying thickness in the axial direction as illustrated in embodiments (b) and (c) in FIGS. 3C and 3D, the outer configuration of the inner die 5 has to be changed from a vertical straight configuration. Each roller 6 is capable of rotating about a roller axis and rotates receiving a torque from the workpiece during drawing. Therefore, the roller 6 does not stick to the workpiece.

Next, steps unique to each embodiment of the present invention will be explained.

In the method according to the first embodiment of the present invention, as illustrated in FIG. 4, during stamping, the flat disk material 2 is obtained by stamping four corners of the flat plate 1 having a square at a circle having a diameter greater than a length of a side of the square. The disk material 2 has four arc portions 2a and four straight portions 2b. After deforming, the arc portions 2a become the general portions 4a and the straight portions 2b become ventilation portions 4b. During plastically deforming the disk material 2, the disk 3 is deformed such that the axially inboard edge 4 of the flange portion 3a has four general portions 4a and four ventilation portions 4b. Each of the ventilation portions 4b is located between adjacent two general portions of the four general portions 4a and is curved in an axially outboard direction from the plane in which the four general portions 4a are located. During drawing, the flange portion 3a is drawn such that the flange portion 3a has a thickness equal to or less than 90% of the thickness of the disk material 2 at at least the general portions 4a of the axially inboard edge 4.

Further, during drawing, the ventilation portions 4b are drawn such that the ventilation portions 4b have a thickness equal to or less than the thickness of the general portions 4a and equal to or less than 100% of the thickness of the disk material 2 at at least an axially end of a center 15 of the ventilation portion 4b.

In the method according to the second embodiment of the present invention, as illustrated in FIG. 7, during stamping, the flat plate 1 is stamped such that the disk material 2 has a substantially circular configuration. During plastically deforming the disk material 2, the disk 3 is deformed such that the axially inboard edge 4 of the flange portion 3a has the general portion 4a only and does not have a ventilation portion. The general portion 4a is located in the plane perpendicular to the axis of the disk. During drawing, the flange portion 3a is drawn such that the flange portion 3a has a thickness equal to or less than 90% of the thickness of the disk material 2 at an entire circumference of the axially inboard edge 4 of the flange portion 3a.

Next, effect of the disk 3 and the method for manufacturing the disk 3 will be explained.

Figure 1:
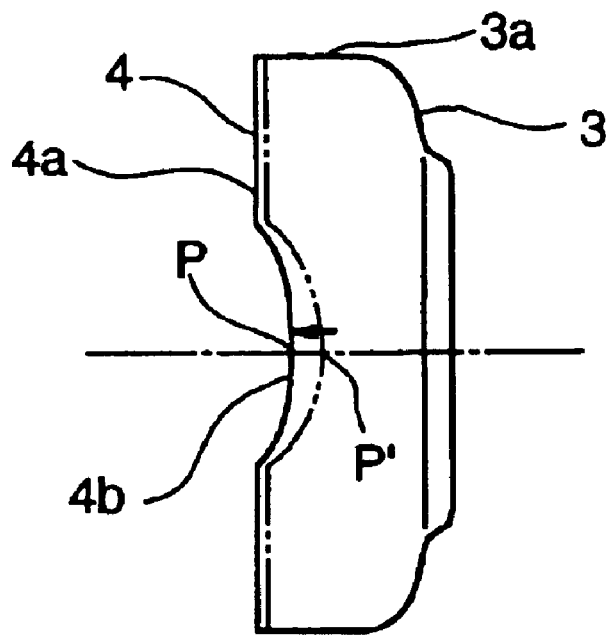
FIG. 1 is a side view of a lightened disk for a wheel according to a first embodiment of the present invention.

The flange portion 3a is thinned and lightened as a result of drawing. In FIG. 1, a disk of a case where no drawing is conducted is illustrated by a line with two dashes. By comparing the full line and the double dashed line, it will be understood that the flange portion 3a extends to the full line. In the case where the flange portion has the ventilation portion 4b, the center P' of the ventilation portion 4b before drawing is shifted to position P, as a result of the drawing.

Due to the extension, the diameter of the circle at which the four corners of the square disk material 2 is stamped (in the case of circular disk material, the diameter of the circular disk material 2) can be decreased by substantially twice the axial extension amount of the general portion 4a of the flange portion 3a. Further, in the case of square disk material corners of which are cut as with the first embodiment of the present invention, the length of the side of the square disk material can be decreased by substantially twice the shift amount from point P' to point P.

The amount of weight reduction of the wheel due to the present invention depends on the size of the disk and the length of the flange portion. The longer the flange portion, the greater the amount of the weight reduction. A general relationship between the size of the disk and the amount of weight reduction is as follows:

13 inch disk: 100–520 g
14 inch disk: 110–570 g
15 inch disk: 120–620 g

The weight reduction is accompanied by a decrease in the amount of material required to make the disks and a decrease in production costs. Further, with drawing, the disk is able to be formed with a high accuracy and is made stable, whereby vibration during operation of a vehicle to which the wheel is mounted decreases. Further, the coupling strength between the rim and the disk is improved, whereby reliability of a strength characteristic is improved.

According to the present invention, the following technical advantages are obtained:

First, according to the disk having a reduced weight, since the flange portion 3a has a thickness equal to or less than 90% of the thickness of the disk material 2 at at least the general portions 4a, the flange portion 3a can be thinned without causing a strength problem. Further, a yield or efficiency of the material is improved and a material cost for the disk is decreased.

Second, in the case where the flange portion 3a has a substantially constant thickness over an entire axial length of the flange portion, the flange portion 3a can be drawn without breaking and can be drawn to the thickness of 50–90% of the thickness of the disk material 2.

Third, in the case where the flange portion 3a has a gradually decreasing thickness in a direction from a root of the flange portion to the axially inboard edge, the flange portion 3a can be drawn without breaking and the axial edge of the flange portion 3a can be drawn to the thickness of 30–70% of the thickness of the disk material 2.

Fourth, in the case where the axial inboard edge 4 of the flange portion 3a has a ventilation portion 4b, a square plate corners of which are arcuately cut can be used as a disk material 2, so that a square blank of a small size can be used resulting in a decrease in the material cost.

Fifth, in the case where the ventilation portions 4b have a thickness equal to or less than said thickness of the general portions 4a and equal to or less than 100% (preferably, less than 60%) of the thickness of the disk material 2 at at least an axially end of a center of the ventilation portion 4b, the disk 3 can be lightened without causing a strength problem.

Sixth, in the case where the axially inboard edge 4 of the flange portion 3a includes the general portion 4a only and the flange portion has a thickness equal to or less than 90% of the thickness of said disk material 2, the disk 3 can be lightened without causing a strength problem, the amount of material for the disk can be reduced and lowered production costs can be achieved.

Seventh, according to the method for manufacturing the disk, since the flange portion 3a is drawn such that the flange portion 3a is reduced to a thickness equal to or less than 90% of a thickness of the disk material 2 at the general portion 4a of the axially inboard edge 4, the disk 3 can be lightened without causing a strength problem, the amount of the material for the disk can be reduced and lowered production costs can be achieved. Further, since a radial dimension becomes highly accurate during drawing, the radial deflection of the disk is decreased and the reliability of a strength characteristic is improved.

Eighth, in the case where drawing is conducted using an inner die and an outer die having a gap less than 90% of the thickness of the disk material 2 between the inner die and the outer die, the flange portion 3a can be thinned without fail.

Ninth, in the case where the disk 3 is manufactured from the square disk material 2 four corners of which are cut, a square blank of a small size can be used for the disk material 2 and an amount of material for the disk can be reduced.

Tenth, in the case where the ventilation portions 4b are drawn such that the ventilation portions 4b have a thickness equal to or less than said thickness of the general portions 4a and equal to or less than 100% (preferably, less than 60%) of the thickness of the disk material 2 at at least an axially end of a center of the ventilation portion, the disk 3 can be further lightened without causing a strength problem and an amount of material for the disk can be further reduced.

Eleventh, in the case where the disk 3 is manufactured from a circular disk material 2 and the flange portion 3a is drawn such that the flange portion 3a has a thickness equal to or less than 90% of the thickness of the disk material 2, the disk 3 can be further lightened without causing a strength problem and an amount of material for the disk can be further reduced.

Although the present invention has been described with reference to specific exemplary embodiments, it will be appreciated in the art that various modifications and alterations can be made to the particular embodiments shown, without materially departing from the novel teachings and advantages of the present invention. Accordingly, it is to be understood that all such modifications and alterations are included within the spirit and scope of the present invention as defined by the following claims.

What is claimed is:

1. A method of manufacturing a lightened disk for a wheel comprising:

stamping a flat disk material from a flat plate;

manufacturing a disk by plastically deforming said disk material at least one time so that said disk includes a straightly cylindrical flange portion having an axially inboard edge, said axially inboard edge including at least one general portion extending circumferentially in a plane essentially perpendicular to a rotational axis of said disk along at least a portion of said axially inboard edge; and using an inner die and an outer ring die having a radially inwardly protruding protrusion, drawing said straightly cylindrical flange portion into a thinner straightly cylindrical portion while said disk material is being plastically deformed during at least one of the times said disk material is being plastically deformed or after at least one of the times said disk material is being plastically deformed so that said straightly cylindrical flange portion is reduced to a thickness equal to or less than about 90% of an original thickness of said disk material at said general portion of said axially inboard edge.

2. A method according to claim 1, wherein said inner die and said outer die have a gap less than 90% of said original thickness of said disk material therebetween.

3. A method according to claim 1, wherein said flat plate has an essentially square configuration, and wherein during said stamping, said flat disk material is obtained by removing four corner portions of said flat plate, each of said corner portions being defined by two corner edge portions of said flat plate and an arcuate portion of a circle having a diameter greater than a length of a side of said square;

wherein during said plastically deforming said disk material, said disk is deformed such that said axially inboard edge of said flange portion includes four general portions, and such that said axially inboard edge further includes four ventilation portions, each of said ventilation portions being located between two adjacent general portions of said four general portions and being curved in an axially outboard direction from said plane in which said four general portions are located; and wherein during said drawing, said flange portion is drawn such that said flange portion has a thickness equal to or less than about 90% of said thickness of said disk material at at least said general portions of said axially inboard edge.

4. A method according to claim 3, wherein during said drawing, said ventilation portions are drawn such that said ventilation portions have a thickness equal to or less than said thickness of said general portions and equal to or less than said thickness of said disk material at at least an axial end of a center of said ventilation portion.

5. A method according to claim 1, wherein during said stamping, said flat plate is stamped such that said disk material has a substantially circular configuration;

during said manufacturing said disk by plastically deforming said disk material, said disk is deformed such that said axially inboard edge of said flange portion has said general portion only, said general portion being located in said plane essentially perpendicular to said rotational axis;

during said drawing, said flange portion is drawn such that said flange portion has a thickness equal to or less than about 90% of said thickness of said disk material at an entire circumference of said axially inboard edge of said flange portion.

* * * * *